United States Patent
Locker et al.

(10) Patent No.: US 8,707,327 B2
(45) Date of Patent: Apr. 22, 2014

(54) METHODS AND ARRANGEMENTS FOR EFFECTING SUPPLEMENTARY MAIL TRANSFER OR MANAGEMENT

(75) Inventors: Howard Locker, Cary, NC (US); David Challener, Raleigh, NC (US); Daryl Cromer, Cary, NC (US); James S. Rutledge, Durham, NC (US); Randall Scott Springfield, Chapel Hill, NC (US); James J. Thrasher, Efland, NC (US); Michael Vanover, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1694 days.

(21) Appl. No.: 11/865,051

(22) Filed: Sep. 30, 2007

(65) Prior Publication Data
US 2009/0089808 A1    Apr. 2, 2009

(51) Int. Cl.
G06F 9/44     (2006.01)
G06F 13/00    (2006.01)
G06F 15/16    (2006.01)
H04B 1/38     (2006.01)

(52) U.S. Cl.
USPC ............. 719/313; 709/206; 455/73; 455/574

(58) Field of Classification Search
None
See application file for complete search history.

(56) References Cited

U.S. PATENT DOCUMENTS

| 6,028,472 | A  | * | 2/2000 | Nagumo ..................... 327/512 |
| 6,058,168 | A  |   | 5/2000 | Braband |
| 7,177,782 | B2 |   | 2/2007 | Falik |
| 2005/0066006 | A1 | * | 3/2005 | Fleck et al. .................. 709/206 |
| 2007/0083780 | A1 |   | 4/2007 | Aoyagi |
| 2007/0113286 | A1 |   | 5/2007 | Cromer |
| 2007/0168047 | A1 |   | 7/2007 | Cromer |
| 2007/0213045 | A1 | * | 9/2007 | Hermansson et al. ........ 455/425 |
| 2008/0130156 | A1 | * | 6/2008 | Chu et al. ........................ 360/71 |
| 2009/0197652 | A1 | * | 8/2009 | Lundstrom et al. ........... 455/574 |
| 2009/0238104 | A1 | * | 9/2009 | He et al. ........................ 370/311 |

FOREIGN PATENT DOCUMENTS

| DE | 102006053181 A1 | 5/2007 |
| DE | 102007001652 A1 | 7/2007 |
| EP | 0870386 B1 | 7/1997 |
| EP | 1420387 A1 | 3/2003 |
| GB | 2432935 A1 | 6/2007 |
| JP | 2005242431 A1 | 9/2005 |

OTHER PUBLICATIONS

Tixi.com GmbH, Tixi Handbuch, Berlin: Aug. 2000 (66 pages).
Toshiba Europe GmbH, Toshiba Presseinformation: Push it! High Speed Kommunikations-profi Toshiba Portege R400 mit Push-E-mail-Funktion, Mar. 15, 2007 (6 pages).
Funkschau, Einkaufsfuhrer (shopping guide), Schutz vor Hackern (Tixi.com GmbH) (p. 82), Funkschau 24/2000, 2000 (3 pages).

* cited by examiner

*Primary Examiner* — Qing Wu
(74) *Attorney, Agent, or Firm* — Ference & Associates LLC

(57) ABSTRACT

Arrangements for permitting incoming mail to be transferred from a WAN Drive to a notebook computer hard drive under conditions that are not stressful to the hard drive. Preferably, a WAN card is configured to wake a notebook when mail capacity is full or close to full. Mail is then preferably moved from the flash drive to the hard drive, subject to verification that this will not overly stress the hard drive. In a variant embodiment, the WAN card may preferably be configured to wake a notebook when mail is received at all. Again, mail is then preferably moved from the flash drive to the hard drive, subject to verification that this will not overly stress the hard drive. Once mail is moved to the hard drive, the system preferably runs an embedded email program that allows the user to employ an existing VPN infrastructure.

21 Claims, 2 Drawing Sheets

METHODS AND ARRANGEMENTS FOR EFFECTING SUPPLEMENTARY MAIL TRANSFER OR MANAGEMENT

FIELD OF THE INVENTION

The present invention relates generally to wireless area network (WAN) subsystems in notebook computers and the like, and to methods and arrangements for managing such subsystems in connection with incoming mail.

BACKGROUND OF THE INVENTION

Over the past decade, tremendous strides have been made in the realm of notebook computers (which may also alternatively be referred to as "notebooks", "laptops" or "laptop computers" in the present discussion). Currently in development, and likely indicative of an upcoming general trend, are notebooks that have wireless area network (WAN) subsystems that can be powered on when the notebook itself is powered off. Such a WAN subsystem is thus capable of receiving email from a push mail server and storing the email in a WAN Drive which can be flash memory or any storage that maintains state without power when the notebook is powered off.

As encouraging as this general development may be, several challenges and limitations have already been coming into focus. Generally, the memory has a fixed size and can easily fill up. Conventional solutions implement a first-in-first-out system where oldest mail is deleted to allow new mail to be stored, but of course this may result in important mail at the end of the queue never being read by a user.

Further, users may well see some utility in being able to respond to mail without having to power up their system, since (for instance) loading WINDOWS XP or WINDOWS VISTA, or any OS (operating system), connecting to a network, and running a corporate Virtual Private Network (VPN) is very time consuming. None of this is facilitated in the least, of course, if no wireless or wired network connection is actually available.

Accordingly, compelling needs have been recognized in connection with not only embracing emerging capabilities afforded by WAN subsystems in notebooks, but in optimizing their use in a manner to avoid the pitfalls and inconveniences as described above.

SUMMARY OF THE INVENTION

In accordance with at least one presently preferred embodiment of the present invention, there are broadly contemplated herein arrangements for permitting incoming mail to be transferred from a WAN Drive to the notebook hard drive under conditions that are not stressful to the notebook hard drive.

Preferably, a WAN card is configured to wake a notebook (i.e., power it on from its powered off state) when mail capacity is full or close to full. Mail is then preferably moved from the flash drive to the hard drive, subject to verification that this will not overly stress the hard drive.

In a variant embodiment, the WAN card may preferably be configured to wake a notebook when mail is received at all. Again, mail is then preferably moved from the flash drive to the hard drive, subject to verification that this will not overly stress the hard drive. Once mail is moved to the hard drive, the system preferably runs an embedded email program that allows the user to read email, respond, and send replies back to the corporate network using existing VPN infrastructure.

In summary, one aspect of the invention provides a system comprising: a main memory; and a hard drive; a supplementary mail module; said supplementary mail module acting to store incoming mail during shutoff of said hard drive and said main memory; and a transfer module acting to transfer mail from said supplementary mail module to said hard drive under predetermined conditions.

Another aspect of the invention provides a method comprising the steps of: providing a supplementary mail module for a computer; storing incoming mail in the supplementary mail module during shutoff of the computer; and transferring mail from the supplementary mail module to a hard drive of the computer under predetermined conditions.

Furthermore, an additional aspect of the invention provides a program storage device readable by machine, tangibly embodying a program of instructions executable by the machine to perform a method comprising the steps of: providing a supplementary mail module for a computer; storing incoming mail in the supplementary mail module during shutoff of the computer; and transferring mail from the supplementary mail module to a hard drive of the computer under predetermined conditions.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
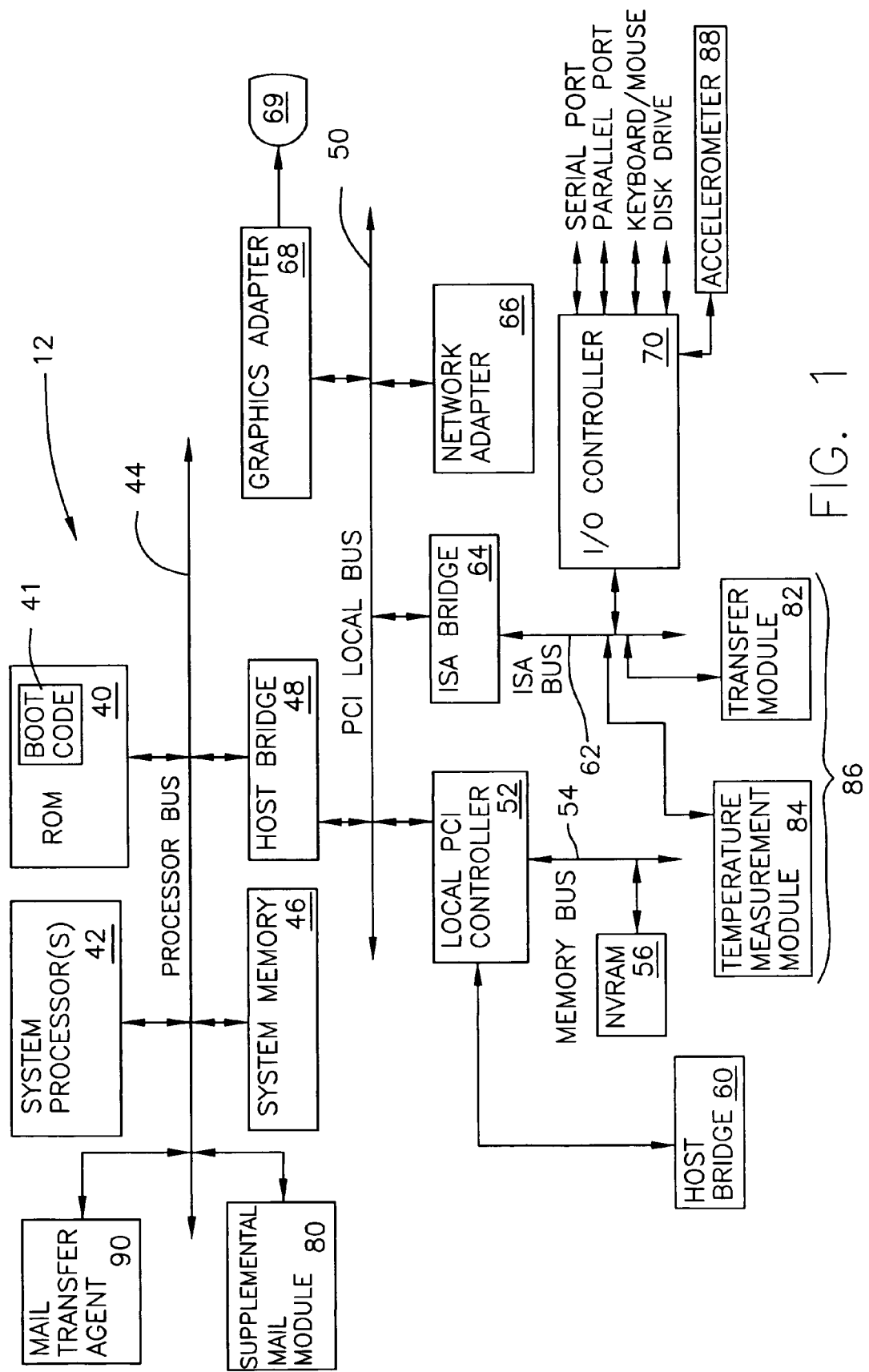
FIG. 1 schematically illustrates a computer system with added components in accordance with an embodiment of the present invention.
Figure 2:
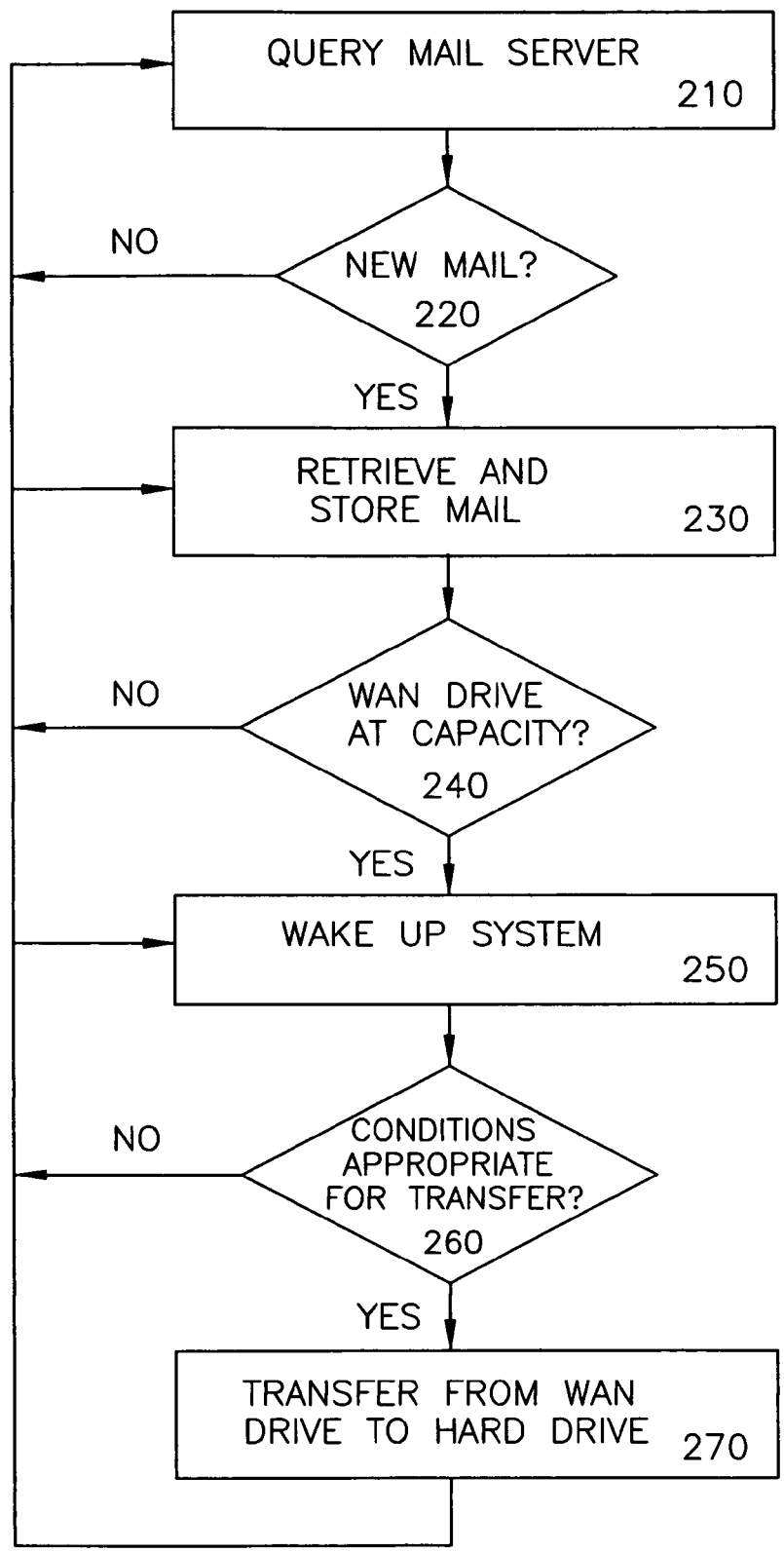
FIG. 2 schematically illustrates a process in accordance with an embodiment of the present invention.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1-2, is not intended to limit the scope of the invention, as claimed, but is merely representative of selected embodiments of the invention.

One or more functional units described in this specification may be labeled as a "module", in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers sold by Lenovo (US) Inc. of Morrisville, N.C., however, as will become apparent from the following description, the present invention is applicable to any data processing system.

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or one of the processors produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard, mouse, and disk drive. In addition, I/O controller 70 supports external communication by computer system 12 via serial and parallel ports. Of course, it should be appreciated that the system 12 may be built with different chip sets and a different bus structure, as well as with any other suitable substitute components, while providing comparable or analogous functions to those discussed above.

Additional components are illustrated in FIG. 1, in accordance with preferred embodiments of the present invention. The present discussion focuses on computer system 12 as a notebook system, in accordance with at presently preferred embodiment of the present invention. Indicated at 80 is a supplemental mail module that preferably handles email in a manner now to be described. Preferably, supplemental mail module 80 may be embodied in essentially any suitable manner. In a particularly preferred embodiment of the present invention, it may be embodied by a WAN subsystem such as a WAN Drive together with a controller. Preferably, the controller performs tasks such as running the VPN, replicating mail, and waking up the system when the flash memory of the WAN Drive is full. Though continued reference will be made to a WAN subsystem or WAN Drive, it should be understood that module 80 can be embodied by any of a wide variety of other analogous and analogously functioning components or sets of components.

Generally, a WAN subsystem (at 80) receives power from a notebook battery even when the notebook is suspended or off. This allows the WAN Drive (at 80) to receive packets from the wireless WAN network (not shown). A push mail server infrastructure may be utilized which pushes email to the WAN Drive at 80 (essentially in a manner similar to what occurs with "BLACKBERRY" devices today). It is presently preferred, however, that the WAN subsystem queries the server to see if new mail is pending every X units of time. Although any time interval may be used, the time interval selected is a policy based decision as to what is acceptable to any given user. Although any appropriate infrastructure may be used, this is the presently preferred infrastructure given the decrease in power consumption.

Indicated at 86 is a BIOS (basic input/output system) that may preferably include what is referred to hereinthroughout as a transfer module (82) and a temperature measurement module (84). These components, as well as the functioning of a BIOS in accordance with at least one presently preferred embodiment of the present invention, will be better understood from further discussion herebelow.

Eventually, the WAN Drive at 80 will fill up. When this happens, the WAN Drive at 80 preferably interrupts the notebook computer with a wake up event. The BIOS 86 will then preferably check the wake up event and ascertain a need to move the mail from the WAN Drive at 80 to the hard drive (e.g. encompassed by system memory 46). However, in accordance with a presently preferred embodiment of the present invention, the hard drive at 46 will not be used as such if the system is undergoing physical movement, since such movement could easily damage critical data on the drive.

Accordingly, the notebook system 12 is preferably provided with an accelerometer 88 that detects motion or lack of motion. One example of a commercially available accelerometer which may be used for this purpose is a MXc6202xM accelerometer available from MEMSIC, Inc., of Andover, Mass. The notebook BIOS 86, particularly transfer module 82, thus preferably queries the accelerometer 88 for a predetermined period of time. If, and only if, motion at or below a predetermined threshold (most preferably zero) is detected, the transfer module 82 at BIOS 86 will preferably start the transfer of mail from the WAN Drive at 80 to the hard drive at 46.

During such transfer, it is also preferably ensured that the notebook system 12 is not overheating, as might be the case when the notebook is in a confined area without significant airflow. Accordingly, temperature measurement module 84 at BIOS 86 will also preferably ascertain a temperature of the system 12. While the temperature may be determined in any number of places, it is presently preferred that the temperature be measured at the hottest part or parts of the system. While the hottest part(s) may vary depending on system design, typically the hottest part would be at the graphics processor or the system processor. When the temperature reaches a predetermined threshold, the BIOS 86, via transfer module 82, may thus preferably act to throttle and/or stop the ongoing mail transfer to allow the system 12 to cool down. As such, once the system 12 cools down below a predetermined threshold, the transfer module 82 at BIOS 86 preferably acts to prompt a continuation of the mail transfer.

In terms of the mail transfer itself, several methods are conceivable. In a relatively simple method, the transfer module 82 at BIOS can act to move data directly as this would not necessitate the loading of an OS and associated applications. In an alternative method, a small custom OS could be loaded that performs the data moving operation. Or, in yet another alternative, an entire OS could actually load.

In a particularly preferred implementation, data can be read from the WAN Drive at 80 and directly written into the local mail file on the hard drive at 46. In this regard, it should be noted that the data stored on the WAN Drive need not be in the same format used by the local mail client. It is presently preferred that the WAN Drive store the data in the format which is the most space efficient and the data be translated into a format compatible with the local email client (e.g., MS Exchange, Lotus Notes, etc) when written into the local mail file. Accordingly, when the notebook is powered up and a user goes to mail, all of the mail from the WAN Drive will already be in the local mail file.

Preferably, in such an operation, mail transfer from the WAN Drive at 80 to the local mail file can initiate at an opportune time even before the WAN Drive at 80 is close to full. Thus, a percentage threshold (of how full the WAN Drive is) may be predetermined and preset, beyond which a window can be found when the notebook is not moving; thus, it would not be necessary to wait until the WAN Drive is close to full before mail transfer begins. Of course, the transfer module 82 at BIOS will preferably terminate any such transfer as soon as any motion (or motion above a predetermined threshold) or high temperature is detected, in order to avoid hard drive damage as discussed further above.

In some applications, there may be a password set for access to the hard drive at 46. Nominally, in such a case, the BIOS would not be able to write to the hard drive at 46 since the BIOS would not per se employ the password. However, many newer drives embrace the concept of a partition that can be isolated and is not password protected. Accordingly, when push email software is installed, if the user indicates the presence of a hard drive password, the following may preferably be undertaken. First, a flag may be suitably set (e.g., in the WAN Drive or in the BIOS). The BIOS 86 (e.g., transfer module 82) may then preferably check this flag. s If the BIOS 86 (e.g., transfer module 82) determines that the flag is not set, a mail transfer operation as described heretofore will be undertaken. However, if the flag is indeed set, the transfer module 82 at BIOS 86 preferably will not move the email from the WAN card to the unprotected area of the drive. Rather, when the system 12 boots, a mail transfer agent 90 running under the operating system will then perform the movement of the email from the unprotected area of the drive into the local mail file which is contained on the protected area of the drive. The mail can preferably be encrypted with the user's email key so it is still protected even when stored on the unprotected part of the drive. Alternatively, email may be stored on an unprotected part of a drive and an operating system agent may then move the email to protected area when notebook resumes. Preferably when the email is stored in unprotected area, the email would still be encrypted, so the email would be secure.

Referring now to FIG. 2, a flow chart of an embodiment discussed above is shown. At Step 210, the WAN subsystem periodically queries the mail server. At Step 220, it is determined whether or not new mail is present on the server. If new mail is present, the new mail is retrieved and stored on the WAN Drive at Step 230. At Step 240, it is then determined whether or not the WAN Drive is at capacity. If the WAN Drive is at capacity, then the system is awoken at Step 250. Whether or not conditions are appropriate to transfer mail from the WAN Drive to the hard drive is determined at Step 260. If conditions are appropriate, the mail is then transferred to the hard drive at Step 270.

In a variant implementation of the present invention, a notebook system 12 may be in "suspend" mode with a VPN dialer and a local email client program loaded. As can be appreciated, the WAN card at 80 can still receive packets from the wireless WAN network. In this implementation of the present invention, the WAN subsystem preferably does not include a WAN Drive and a processor, as the WAN subsystem "wakes" up the system to replicate when mail is pending.

Preferably, the push mail server infrastructure mentioned heretofore is enabled to alert the WAN card at 80 when mail is pending. This can be done by sending a simple text message to the WAN card at 80. Thence, the WAN card at 80 can interrupt the notebook with a wake up event when mail is pending (e.g., upon receipt of a text message as just described). Accelerometer 88 can detect motion or lack of motion as described heretofore, and the BIOS 86 can likewise query the accelerometer 88 for a predetermined period of time. If, and only if, motion at or below a predetermined threshold (most preferably zero) is detected, the BIOS 88 will preferably resume the system 12. Once the system 12 is resumed, an agent preferably runs that restarts the VPN dialer using the WAN card as the network connection. The VPN dialer can be very important in such a context, as it may well represent the only secure transfer mechanism for corporate information. Thence, the transfer of mail from the mail server to the local mail file on the notebook 12 may be undertaken. As discussed heretofore, during such transfer it will also preferably be ensured that the notebook is not overheating, whereby the temperature measurement module 84 at BIOS 86 may ascertain the temperature of the system 12 and prompt a throttling and/or cessation of the transfer when the temperature exceeds a threshold. Once the system 12 cools down again, the local mail client program can be prompted to continue to run. Alternatively, a "pull system" action may be employed at predetermined time intervals whereby the WAN card at 80 wakes up the system 12 to replicate mail. This time interval can vary in accordance with essentially any predetermined parameters, such as the time of day or the day of the week, etc.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system comprising:
    a main memory;
    a hard drive; and
    a supplementary mail module;
    said supplementary mail module acting to store incoming mail during shutoff of said hard drive and said main memory; and
    a transfer module acting to transfer mail from said supplementary mail module to said hard drive under predetermined conditions:,
    wherein said transfer module acts to transfer mail from said supplementary mail module to said hard drive in accordance with a physical condition of said system.

2. The system according to claim 1, wherein said transfer module is incorporated in a system basic input/output system (BIOS).

3. The system according to claim 1, wherein said supplementary mail module comprises a wireless area network (WAN) card flash drive.

4. The system according to claim 1, wherein said system comprises a notebook computer.

5. The system according to claim 1, wherein said supplementary mail module acts to power on said hard drive and main memory upon storing incoming mail beyond a predetermined threshold capacity.

6. The system according to claim 1, further comprising:
    a movement detection module which ascertains physical movement of said system;
    said transfer module acting to transfer mail from said supplementary mail module to said hard drive upon said movement detection module detecting physical movement of said system below a predetermined threshold.

7. The system according to claim 6, wherein said movement detection module comprises an accelerometer.

8. The system according to claim 6, wherein said transfer module acts to inhibit mail transfer from said supplementary mail module to said hard drive upon said movement detection module detecting physical movement of said system above a predetermined threshold.

9. The system according to claim 1, further comprising:
    a temperature measurement module which ascertains a system temperature;
    said transfer module acting to inhibit mail transfer from said supplementary mail module to said hard drive upon said temperature measurement module detecting a system temperature above a predetermined threshold.

10. The system according to claim 1, wherein:
    said hard drive comprises a protected area and an unprotected area;
    said transfer module acts to transfer mail from said supplementary mail module to said unprotected area of said hard drive;
    said system further comprises a mail transfer agent;
    said mail transfer agent acts to transfer mail from said unprotected area of said hard drive to said protected area of said hard drive upon system booting.

11. The system according to claim 1, wherein:
    said supplementary mail module acts to power on said hard drive and main memory upon receiving incoming mail; and
    said transfer module acts to thereafter transfer incoming mail to said hard drive under predetermined conditions.

12. The system according to claim 11, further comprising a corporate email module which acts to run an embedded mail program to permit management of incoming mail at said hard drive.

13. The system according to claim 12. wherein said corporate email module further acts to communicate with a corporate network via VPN infrastructure.

14. A method comprising the steps of:
    storing incoming mail in a supplementary mail module arranged within a computer during shutoff of the computer; and
    transferring mail from the supplementary mail module to a hard drive of the computer under predetermined conditions;
    wherein said transferring comprises transferring mail from the supplementary mail module to the computer hard drive in accordance with a physical condition of the computer.

15. The method according to claim 14, wherein the computer comprises a notebook computer.

16. The method according to claim 14, further comprising powering on the computer upon storing incoming mail beyond a predetermined threshold capacity.

17. The method according to claim 14, wherein said transferring of mail in accordance with a physical condition of the computer comprises transferring mail upon physical movement of the computer being below a predetermined threshold.

18. The method according to claim 14, wherein said transferring comprises:
    transferring mail from the supplementary mail module to an unprotected area of the computer hard drive; and
    transferring mail from an unprotected area of the computer hard drive to a protected area of the computer hard drive upon the computer booting.

19. The method according to claim 14, further comprising:
    receiving incoming mail at the supplementary mail module and thereupon waking the computer; and said transferring comprising transferring incoming mail to the computer hard drive under predetermined conditions.

20. The system of claim 1, wherein said a physical condition of the system comprises a physical condition selected from the group of conditions comprising motion and temperature.

21. A program storage device readable by machine, tangibly embodying a program of instructions executable by the machine to perform a method comprising the steps of:
- storing incoming mail in a supplementary mail module arranged within a computer during shutoff of the computer; and
- transferring mail from the supplementary mail module to a hard drive of the computer under predetermined conditions;
- wherein said transferring comprises transferring mail from the supplementary mail module to the computer hard drive in accordance with a physical condition of the computer.

* * * * *